(12) United States Patent
Tournier

(10) Patent No.: US 7,301,583 B2
(45) Date of Patent: Nov. 27, 2007

(54) DEVICE AND METHOD FOR TRANSPORTING DEMODULATED DIGITAL VIDEO DATA AND CORRESPONDING DIGITAL TELEVISION RECEIVER

(75) Inventor: Christian Tournier, Seyssinet (FR)

(73) Assignee: STMicroelectronics S.A., Montrouge (FR)

( * ) Notice: Subject to any disclaimer, the term of this patent is extended or adjusted under 35 U.S.C. 154(b) by 635 days.

(21) Appl. No.: 10/666,839

(22) Filed: Sep. 19, 2003

(65) Prior Publication Data
US 2004/0114051 A1 Jun. 17, 2004

(30) Foreign Application Priority Data
Sep. 19, 2002 (FR) .................................. 02 11616

(51) Int. Cl.
*H04N 5/268* (2006.01)
(52) U.S. Cl. .................. 348/706; 348/552; 348/553
(58) Field of Classification Search ........ 348/554–556, 348/558, 564, 565, 725, 726, 553, 552, 705, 348/706; 725/48
See application file for complete search history.

(56) References Cited

U.S. PATENT DOCUMENTS 5,719,637 A * 2/1998 Ohkura et al. ............... 725/56
6,122,374 A * 9/2000 Goujon et al. .............. 380/227
2001/0056576 A1* 12/2001 Park et al. .................... 725/48
2002/0101991 A1 8/2002 Bacon et al.

FOREIGN PATENT DOCUMENTS

WO WO 00/77650 12/2000

OTHER PUBLICATIONS

French Preliminary Search Report dated Aug. 14, 2003 for French Application No. 0211616.

* cited by examiner

*Primary Examiner*—Michael H. Lee
(74) *Attorney, Agent, or Firm*—Lisa K. Jorgenson; Stephen Bongini; Fleit Kain Gibbons Gutman Bongini & Bianco P.L.

(57) ABSTRACT

A routing device is provided for transporting digital data from demodulated digital television signals. The routing device includes a network that routes the digital data to demultiplexers via at least one decoding module. The network includes means for connecting to at least two independent demodulation channels, with each of the demodulation channels producing digital data from a demodulator. The network allows individual routing of the digital data from each of the demodulation channels to the demultiplexers via at least one decoding module. Also provided are a corresponding routing method and a host device that includes such a routing device. Exemplary applications of the routing device and method are a digital television receiver with an image incorporation (picture in picture) function, and a digital television combined with a recording device.

22 Claims, 3 Drawing Sheets

Prior art

Prior art

DEVICE AND METHOD FOR TRANSPORTING DEMODULATED DIGITAL VIDEO DATA AND CORRESPONDING DIGITAL TELEVISION RECEIVER

CROSS-REFERENCE TO RELATED APPLICATIONS

This application is based upon and claims priority from prior French Patent Application No. 02-11616, filed Sep. 19, 2002, the entire disclosure of which is herein incorporated by reference.

BACKGROUND OF THE INVENTION

1. Field of the Invention

The present invention relates to the reception of digital television signals, and more particularly to the reception of digital television signals in the context of a decoding system using common interface modules operating in a standardized protocol.

2. Description of Related Art

The development of signal processing in digital form in the field of television, as well as the progress of encoding techniques for pay channels, has led to the notion of a common interface (CI) that is meant to be standardized and used on a continental scale.

In this context, it is planned to allow television viewers ("users") to dispose of a large range of pay television channels (or radio stations) provided by different operators. The digital video signals of the pay channels are transmitted in encoded form, and they are decoded upon reception by a demodulator. For this purpose, the demodulator is piloted by an interface unit that allows the selective decoding of a channel, a group of channels, or an occasional program by codes managed by a chip card or the like personalized to the user as part of a subscription.

The operational elements involved on the reception side to manage the digital data flows between an input of digital signals, which may be encoded, and an audio/video output to a television are represented in FIG. 1. This assembly 2 of elements is divided into two main groups: a host 4 that processes the signals from the reception input to the output to the television, apart from the specific aspects of decoding; and at least one module known as a "common interface" module 6 that decodes the signals.

The host 4 comprises a tuner 6 which receives an input of modulated digital signals (RF signals) 10, emitted for example from a satellite dish or a cable terminal, and which selectively extracts the signals of a channel to transmit them to a demodulator 12. The demodulator extracts from the modulated signal of the selected channel the digital audio and video flows. When this data is encoded, which is the case for pay channels, it must be decoded before it can be used. For this purpose, the digital data is transmitted in the form of flows called "encoded transport" to the input of the decoding unit 16 of the common interface 6, where it is decoded and then sent as an input to the demultiplexer 18 of the host 4.

In this example, the output data from the demultiplexer is in compressed form, using the MPEG standard, and is therefore decompressed by an MPEG decoder 20 which produces a 22V video component output in the form of red, green and blue (RGB) signals and 22 A audio to the corresponding television inputs to reproduce the image and sound.

The host 4 and the interface module 6 are each controlled by their own microprocessor (respectively 24 and 26), with the microprocessor of the host responding to commands sent by the user via a remote control unit 28. Furthermore, the two microprocessors 24 and 26 communicate with one another via a command connection 30. The host 4 is thus connected to the interface module 6 by two types of connections on the respective buses: the command bus 30, which handles the internal control of the assembly; and the transport bus 32, which handles the transmission and reception of the data before and after decoding.

The buses 30 and 32 are controlled by a common interface 34, which comprises a software module that permits the exchanges between the host 4 and each interface module 6 to be standardized.

The personalized data concerning the decoding is contained in a computer memory board or a chip card 36 that can be inserted into a card reader provided for this purpose in the interface module 6.

The interface module 6 is used according to a protocol which specifies the hardware aspects, such as the type of connector (generally in the PCMCIA or PC Card format) that connects it to the host 4 and the flows that the two buses 30 and 32 have to handle, and the software aspects associated with the control of this type of module, such as the dialogue mode between the host and interface module, the connection and disconnection procedures, and so on.

For information, the standard stipulates that when there is provided the possibility of connecting more than one interface module 6 to the host 4, the transport connection interface (bus 32) must be connected in series successively through each of the modules, as shown in FIG. 2.

In this representation, the host 4 is connected to a number n of common interface modules 6, designated by IC1-ICn, each with its own two way transport connection 32. The "return" connection (which transports the decoded data) of a module is also connected to the outward bound connection (carrying the encoded data) of the module next to it, by an internal 32c connection which performs the concatenation between these two modules. This concatenation is repeated in the same way for each pair of adjacent modules in order to connect all of the modules sequentially, with the "return" connection of the preceding module connected to the "outward bound" connection of the following module. A bypass function is provided for each module, so that one or each module that is missing or not used can be bypassed in order to access another.

The host 4 must furthermore maintain the command interface connections of each common interface module 6 simultaneously separate and accessible, so that the transactions between the host and the module can be processed independently for each module. When a common interface module 6 is removed, the transport layer of the command interface connecting any other module must not be disrupted or interrupted.

When several interface modules 6 are connected to a host 4, the host must be able to select the module or each module required to decode the service or each service selected.

In compliance with the standard, the transport layer of the command interface operates above the "link" layer provided by the chosen physical application.

The transport protocol is of the command-response type, where the host 4 sends a command to the interface module 6 via a command transport protocol data unit (C_TPDU) and waits for a reply via a response transport protocol data unit (R_TPDU). The module cannot initiate communications; it has to wait for the host to invite it, or first send it data.

Data communication via the interface unit is defined in terms of objects. The objects are coded using Tag Length Value coding, derived from the coding used for ASN.1 syntax.

The application layer uses a series of protocols based on the notion of a resource. A resource defines an operating unit that is available to the applications running on a module. In order for it to be used, each resource must carry a set of objects and a protocol so that they can be mutually exchanged between resources. The communication with the resource is made when a session is created for the resource in question.

In fact, the decoding systems are generally incompatible with the different companies which offer pay services, these companies being competitors. However, it is preferable that the different encoding systems used are transparent for the user, provided that two interface modules or more are connected to the host, with each dedicated to a given decoding system, to allow simultaneous access to several services. The possibility of connecting at least two modules is also attractive for the user who only watches a single source at a given time, because he will not need to physically interchange the modules when changing from one service to another from a rival source.

For more details concerning the specific aspects of the standardization within the European context, refer to the publication "DVB Document AO17" entitled "Common Interface for Conditional Access and Other Digital Broadcasting Decoder Applications", the entire disclosure of which is herein incorporated by reference.

Until now, the standards and solutions proposed only concerned systems with a single demodulator 12, which is associated with one or more interface modules 6, as explained in the previous paragraphs.

It should be remembered that in compliance with the digital television transmission protocols, the signals are broadcast in "multiplex" form. Each multiplex has complete data (video and audio) from a group of several channels (typically five channels). A single demodulator 18 can process in parallel any number of channels from a multiplex, but only one multiplex at a time.

Several interface modules 6 can therefore be provided to decode several channels from the same multiplex. In fact the channels from the same multiplex are not necessarily encoded in the same way, as they may come from different companies. The different interface modules 6 thus allow the user to use different channels from the same multiplex in parallel.

By way of example, the patent WO-A-OO 77650 offers a connection architecture of several interface modules on a single demodulator to allow the connection of the demodulator with one of the modules to be controlled automatically. More specifically, this document provides means for automatically recognizing interface modules once they have been inserted into their connector, and switching command means to permit the data flow routes between the host and the modules to be interchanged.

One of the major limits of techniques limited to a single modulator appears when several audio/video sources (channels) from different multiplexes need to be exploited simultaneously. Examples of applications which require two or more audio/video sources to be exploited simultaneously include: the image incorporation function, also called PIP (picture in picture), where the television displays a main picture from one channel and at the same time incorporates another image on part of the screen; and devices combining a television and a VCR and/or DVD ("combis"), where the television and the recording device each have at least one demodulator to permit independent operation (in particular to allow one channel to be watched while another is being recorded).

Given the number of channels available and likely to interest a user, quite often different channels to be processed at the same time do not come from the same multiplex.

SUMMARY OF THE INVENTION

In view of these drawbacks, it is an object of the present invention to overcome these drawbacks and to provide a common interface which allows several mutually independent demodulation channels to be controlled independently, so that channels from different multiplexes can be handled simultaneously. Preferably, the outputs of the demodulation channels are transferred for processing by one or more interface modules, so that this is transparent for the user.

One embodiment of the present invention provides a routing device for transporting digital data from demodulated digital television signals. The routing device includes a network that routes the digital data to demultiplexers via at least one decoding module. The network includes means for connecting to at least two independent demodulation channels, with each of the demodulation channels producing digital data from a demodulator. The network allows individual routing of the digital data from each of the demodulation channels to the demultiplexers via at least one decoding module.

Another embodiments of the present invention provides a host device for managing reception of digital television signals. The host device includes at least two independent demodulation channels for suppling independently demodulated digital data issued from respective demodulation channels, a routing device for transporting digital data from demodulated digital television signals, and a processor. The routing device includes a network that routes the digital data to demultiplexers via the at least one decoding module, and the network includes means for connecting to the at least two demodulation channels. The network allows individual routing of the digital data from each of the demodulation channels to the demultiplexers via at least one decoding module. The processor allows each of the demodulation channels to be attributed with a respective one of the decoding modules and commands the routing device to route the digital data of each of the demodulation channels from the demodulation channel attributed to the decoding module or to each of the decoding modules attributed and to an input of the demultiplexers.

Yet another embodiments of the present invention provides a routing method for transporting digital data from demodulated digital television signals, using a network for routing the data to demultiplexers via at least one decoding module. According to the method, a connection means of the network is connected to at least two independent demodulation channels, with each of the demodulation channels producing digital data from a demodulator. The digital data is individually routed from each of the demodulation channels to the demultiplexers via at least one decoding module.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
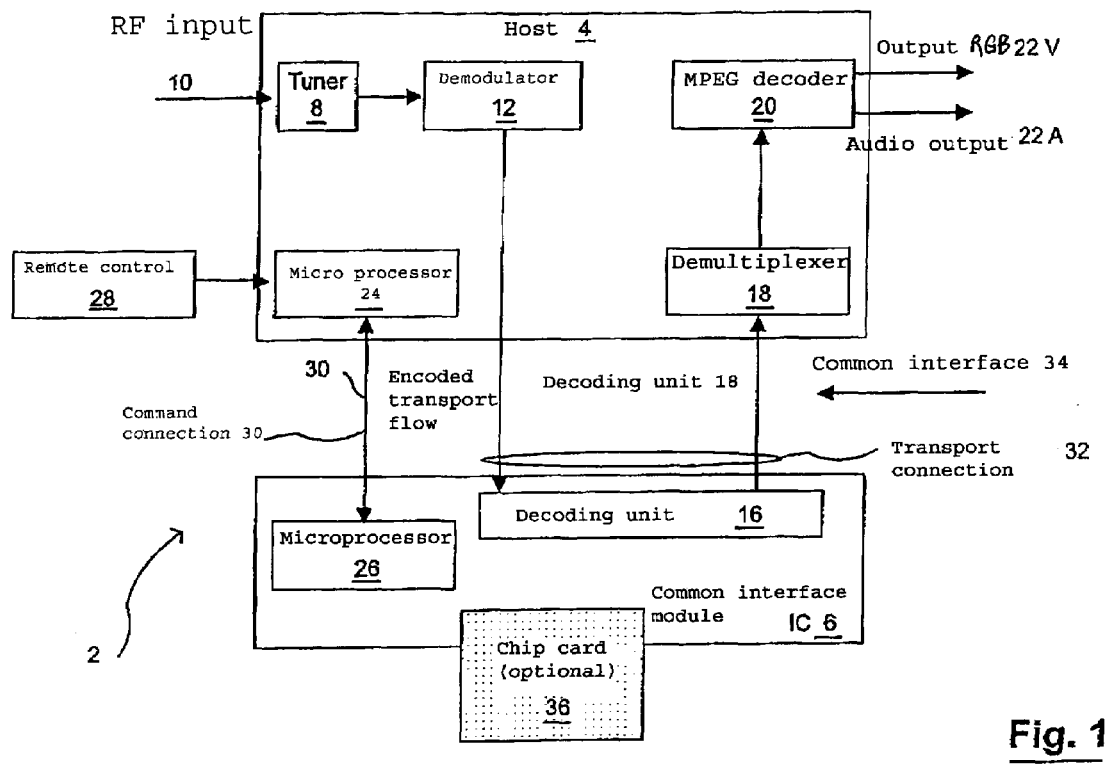
FIG. 1 is a diagram of an assembly composed of a host and an interface module complying with the common digital television standard.

Preferred embodiments of the present invention will be described in detail hereinbelow with reference to the attached drawings.

One preferred embodiment of the present invention provides a routing device for transporting digital video data transmitted from demodulated digital television signals. The device includes a network to route the data to demultiplexing means via at least one decoding module. The network includes means for connecting to a number of independent demodulation channels that each produce digital data, and the network allows the individual routing of digital data from each demodulation channel to demultiplexing means via at least one decoding module.

Preferably, the device is capable of being connected to several decoding modules, and the network includes connection means that permits any of the demodulation channels to be connected to any of the demodulation modules.

When the network controls several decoding modules, it preferably includes connection means for the routing of the digital signals passing via several successive decoding modules, in a random order.

In one preferred embodiment, when the device manages several decoding modules connected to one another in a chain, the network includes connection means which allows the selection, for at least two of the decoding modules, of the direction in which the digital data is transferred.

In some embodiments, the network includes connection means that is capable of being connected to several data inputs from the demultiplexing means, each being capable of independently receiving data from any of the demodulation channels.

Preferably, the device can carry out the routings in response to commands sent from a host device that controls the demodulation of the digital signals, the decoding of the digital data and the demultiplexing of the data.

The present invention also provides a host device associated with at least one decoding module for controlling the reception of digital television signals. The host device includes at least two independent demodulation channels, functionally connected to the routing device to supply independently demodulated digital data from the respective channels. The host device also includes a processor that permits attributing each active channel to a respective demodulation channel and to at least one decoding module, and to command the routing device to route the data of each channel from the attributed demodulation channel to the or to each attributed decoding module and to the demultiplexing means.

Preferably, the host device also includes an attribution table stored in memory to permit the identification of, for each channel identified: i) the demodulation channel(s) to be attributed, and ii) the decoding module(s) to be attributed.

In preferred embodiments, the host device can simultaneously manage signals from at least two active channels, with each channel being processed by a respective demodulation channel, and the demodulated data of each channel being supplied simultaneously to the respective inputs of the demultiplexing means.

In some embodiments, the two active channels are issued from mutually different digital television transmission signal multiplexes.

In preferred embodiments, the at least one decoding module is a "common interface" module complying with the established standard for digital television.

Additionally, the present invention provides a digital television signal receiver that includes a television combined with a recording device so as to permit the simultaneous reproduction of signals on the screen from one channel and the recording of signals from another channel. The digital television signal receiver includes a host device as described above.

Furthermore, the present invention provides a digital television signal receiver with an image incorporation function in which two images from different channels can be displayed simultaneously. The digital television signal receiver includes a host device as described above.

The present invention also provides a routing process for transporting digital video data from demodulated digital television signals. The process uses a network to route the data to demultiplexing means, via at least one decoding module. The connection means is connected to a number of independent demodulation channels producing digital data, and the digital data is individually routed from each demodulation channel to demultiplexing means via at least one decoding module. The features mentioned above in the context of the routing device of the host device or the digital television apply mutatis mutandis to this routing process.

Additionally, the present invention provides an application of the routing process for the simultaneous control of at least a first and second channel of modulated digital television signals, with the data of the first channel being intended for display on the screen as a main image, and the data of the second channel being intended for the display of an image incorporated into the main image.

Furthermore, the present invention provides an application of the routing process for the simultaneous management of at least a first and second channel of modulated digital television signals, with the data of the first channel being intended for real time display on the screen, and the data of the second channel being intended for recording on a recording support.

The present invention also provides an application of the routing process for the simultaneous management of at least a first and second channel of modulated digital television signals, with the first and second channels of digital data belonging to mutually different digital television signal transmission multiplexes.

Figure 3:
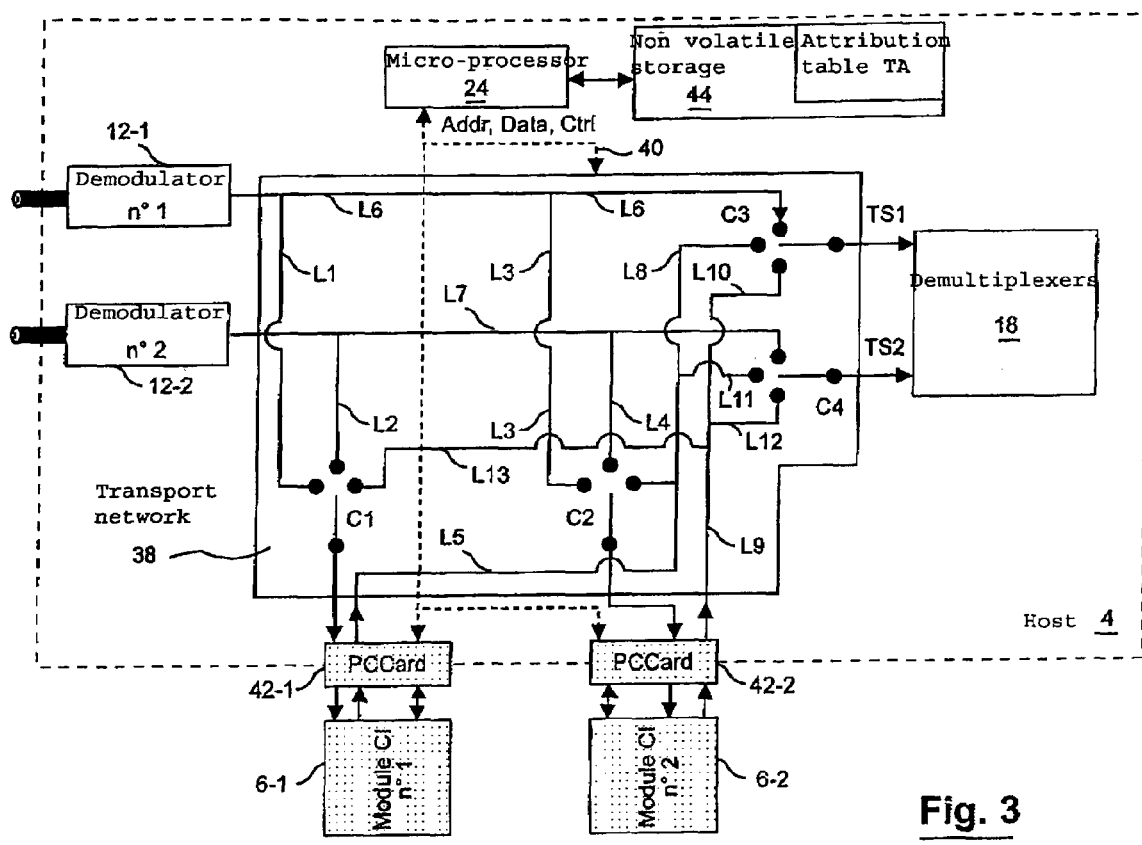
FIG. 3 is a block diagram showing the architecture of the host of a digital television receiving system that permits several demodulators to be controlled in accordance with an embodiment of the present invention.

Exemplary embodiments of the present invention will now be described in detail with reference to FIG. 3. FIG. 3 is a block diagram showing a host architecture according to one embodiment of the present invention for receiving and managing digital television signals within the scope of the DVB-CI (digital video broadcast-common interface) standard. The host 4 is of the multi-module type and, in accordance with the present invention, manages several independent channel inputs (from respective multiplexes) simultaneously. Each managed channel is produced as an output of a respective demodulator 12-1 and 12-2 (two in this example), each of which can be connected to a set of demultiplexers 18, either via one or more common interface modules 6-1 and 6-2 (two in this example), or directly. These demultiplexers are also known in this context as dual transport stream controllers.

The decoding modules 6-1 and 6-2 can be addressed by the microprocessor 24 of the host 4 to select a specified channel to be demodulated on a given multiplex. The data flow transport of the demodulators 12-1 and 12-2 to the demultiplexers 18 passes via a transport network (routing device) 38 that is managed by the microprocessor 24 of the host 4 through signals on an address-data-command type bus 40 (shown as dotted lines) which also commands the two common interface modules 6-1 and 6-2.

In this embodiment, the two common interface modules 6-1 and 6-2 are housed in the host housing by respective PC Card format connectors 42-1 and 42-2 and can be removed.

The host microprocessor 24 exchanges data with a non-volatile storage memory 44, preferably of the EEPROM type or equivalent. This memory contains various configuration data, established according to the choice of services and/or channel installation. In particular, the memory 44 contains a table called an attribution table TA, which is established when the television is installed by the user. One of the uses of this table TA is to explicitly identify the various parameters associated with each of the channels stored in the demodulators 12-1 and 12-2, and the attribution: of the tuner (which is to say the demodulator 12-1 or 12-2) that must be used to receive the channel concerned in a given operating mode (for example, to extract an image to be incorporated into the screen, or to record a program, or the like); and the common interface module(s) 6-1 and 6-2 that need to be used for each pay channel that needs to be decoded.

In this exemplary embodiment, the part of the table containing this attribution information is in the following form (which shows only the portion with the information stored in the non-volatile memory 44 for n channels).

| | ATTRIBUTION TABLE (TA) | | |
|---|---|---|---|
| Channel | Demodulator to be used | Encoded signal? | Common Interface Module (CI) to be used |
| 1 | n°1 | Yes | CI n°1 |
| 2 | n°1 | Yes | CI n°2 |
| 3 | n°1 | Yes | CI n°1 |
| 4 | n°2 | Yes | CI n°2 |
| 5 | n°2 | Yes | CI n°1 |
| 6 | n°2 | Yes | CI n°2 |
| . | . | . | . |
| . | . | . | . |
| . | . | . | . |
| n | n°2 | No | — |

The table designates the demodulators 12-1 and 12-2 respectively as demodulators n°1 and n°2, and the decoding modules 6-1 and 6-2 respectively as CI n°1 and CI n°2. Each decoding module corresponds to an independent demodulation channel of a respective input source of the reception of an external digital signal. This independence of the demodulation channels makes possible the simultaneous reception and processing of two channels from two different multiplexers.

The input from the different demodulators 12-1 and 12-2, depending on the nature of these demodulators, can be the same source of digital television signal presentation, (for example, a ground aerial or a cable), or these inputs may come from different presentation sources (for example, satellite dish/satellite dish, satellite dish/cable, satellite dish/aerial, or cable/aerial). In the first case, it is possible to provide a signal splitter or distributor (not shown) between the source and the demodulators to supply their respective inputs in parallel. The input of the two different decoding modules 6-1 and 6-2 can also be from different sources, depending on the application envisaged.

In the TA table mentioned above, the demodulator to be used is defined with respect to a predefined function (indicated elsewhere), for example for the signal intended for the incorporation of an image.

The information extracted from this TA table is used to command the switching of the signals through the transport network 38 in order to ensure: i) that the demultiplexers 18 receive, for a given channel, the signal from the demodulator attributed to this channel; and ii) when the signal is encoded, that this signal is processed by the common interface module attributed to this channel for decoding. For example, the table indicates to the microprocessor 24 that when the user chooses channel 2 to incorporate an image, the signal from this channel must be extracted from the demodulator n°1, that it is encoded and that it must be decoded by the common interface module CI n°2. This information is translated into commands so as to provide a communication line in the transport network 38 running from the demodulator n°1 to the interface module CI n°2, and from there to one of the inputs (TS1) of the demultiplexers 18. In parallel, and in the same way, the table allows implicitly or explicitly the microprocessor 24 to be informed, to establish a route from the other demodulator (n°2) 12-2 to the other input TS2, possibly via a common interface module, to display the main image on the screen. This route is expressed in corresponding commands to the transport network 38, so that the transport network separately and simultaneously provides two connections between each of the two demodulators and their respective input on the demultiplexers.

The TA table may also include a directory of the channels which compose each of the multiplexes being managed. This permits the analysis of a request requiring the processing of two channels simultaneously, for example to determine: the use of the two demultiplexing channels, if one of these two channels is not contained in the same multiplex; or the option of only using a single demultiplexing channel, if these two channels are contained in the same multiplex. Alternatively, in this case the two decoding modules 6-1 and 6-2 could be commanded to operate on the same multiplex, with each being commanded to decode one of the two channels to be decoded.

In order to allow the routing between the knots formed by the demodulators n°1 and n°2, the common interface modules CI n°1 and CI n°2 and the demultiplexers 18, the transport network includes a cabled line assembly L1 to L3 and four multi-polar switches C1 to C4. These switches comprise an output and two or three inputs in the direction of the data flow, and can be formed by multiplexers whose selection input receives a logic signal according to the commands sent by the microprocessor 24.

Figure 2:
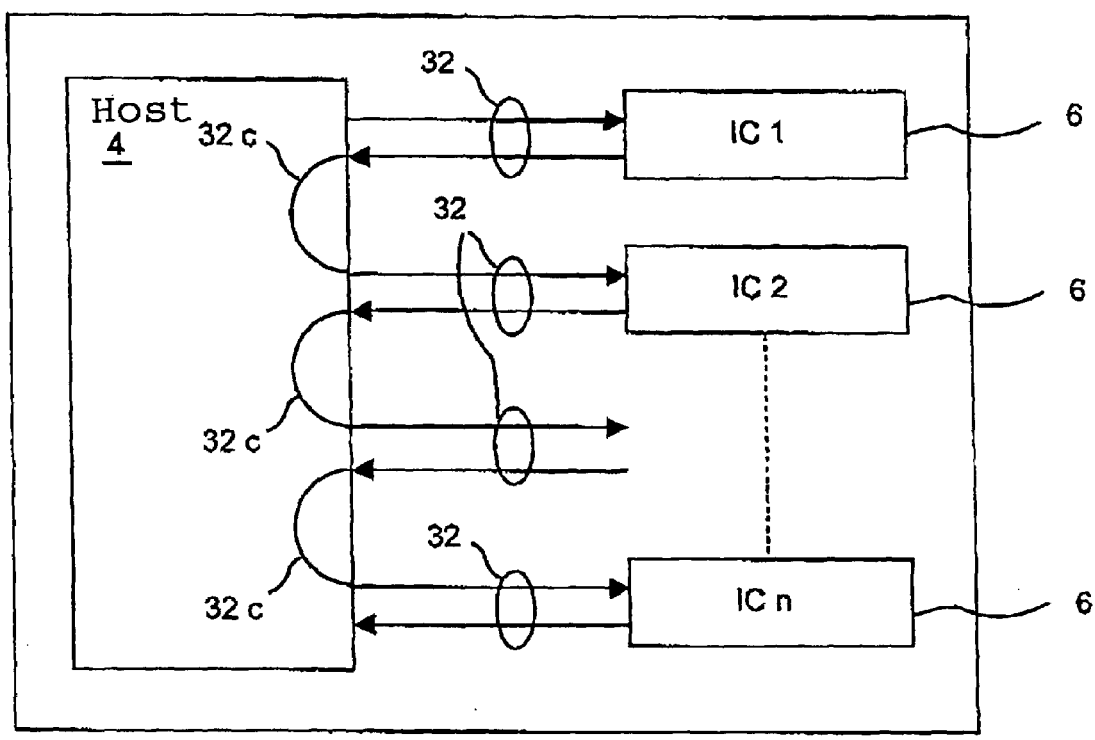
FIG. 2 is a diagram showing the principle of series connection by concatenation of several common interface modules on a host.

The topography of the lines and the switches which form the routing means in the exemplary embodiment of FIG. 3 is as follows. A first switch C1 carries out the switching of the data inputs to the common interface module CI n°1 (via the PC Card connector 42-1) selectively from the demodulators n°1 and n°2 on the respective lines L1 and L2. A second switch C2 carries out the switching of the data inputs to the common interface module CI n°2 (via the PC Card connector 42-2) selectively from the demodulators n°1 and n°2 on the respective lines L3 and L4, as well as an input to this interface module from the common interface module CI n°1 output via the line L5, which forms a concatenation line between the modules 6-1 and 6-2 so as to position the common interface module CI n°2 downstream of the common interface module CI n°1 in the flow traveling from the demodulator to the demultiplexers (and thus corresponds to the connection 32c in FIG. 2).

A third switch C3 carries out the switching of the signals to a first input TS1 of the demultiplexers 18, with these signals selectively coming: directly from the demodulator n°1 (line L6) for non encoded signals (for example channel n in the TA table), from the common interface module CI n°1 (lines L5 and L8) and from the common interface module CI n°2 (lines L9 and L10). A fourth switch C4 carries out the switching of the signals to a second input TS2 of the demultiplexers 18, with these signals selectively coming: directly from the demodulator n° 2 (line L7), from the common interface module CI n°1 (lines L5 and L11) and from the common interface module CI n°2 (lines L9 and L12).

Furthermore, a concatenation connection is provided between the decoding modules 6-1 and 6-2 inverse to that created by the L5 connection, which positions the common interface module CI n°1 downstream of the common interface module CI n°2 in the flow running from the demodulator to the demultiplexers. This inverse concatenation is created by the connection L9 in the output of the common interface module CI n°2, carried on by the connection L13 which leads to the fixed poles of the C1 switch which supplies the common interface module CI n°1 input.

Being able to choose the direction that the concatenation passes through the common interface modules CI n°1 and CI n°2 is advantageous, as it permits the operating context by minimizing the interaction on the flows during decoding.

It can be understood that the topography of the transport network 38 allows the signals from one or the other of the demodulators 12-1 and 12-2 to transit to an input TS1 or TS2 of the demultiplexers 18, and also selectively either directly or via the command interface module CI n°1, or via the command interface module CI n°2. This total flexibility thus permits all cases of the above table to be reproduced, and more generally, all the possibilities of processing simultaneously or individually the signals emitted from the two demodulators 12-1 and 12-2. When the signals from the two demodulators are processed simultaneously, the transport network 38 can handle the routes required for their respective data in complete independence, thus allowing the demodulators to receive these two signals on their respective inputs in a suitably decoded form if they are encoded at source.

For better understanding, there will now be presented two examples of the operation of a television using one of the demodulators 12-1 and 12-2, or both at the same time, by the host assembly 4 and the common interface modules 6-1 and 6-2, through the transport network 38, according to the architecture of FIG. 3.

In the initial situation, the television is in reception mode of a channel i when the user selects via the remote control 28 another channel k. In response, the microprocessor 24 of the host 4 analyses the TA table and loads, among others, the information concerning: i) the demodulator that is to process the signals from channel k, and ii) the common interface module to be used if this signal needs to be decoded. For example, if k=3, the table then indicates that the signals must be extracted from the demodulator n°1 and must be decoded by the common interface module CI n°1 before being transported to the demultiplexers 18.

In the first case, the signals of the channels i and k are attributed to different demodulators, due to the fact that they are contained in different multiplexes and to different interface modules. If the demodulator that is to extract the channel k signal is for example demodulator n°1 (whereas the demodulator used for the channel i being watched is the demodulator n°2), the microprocessor 24 will command the C1-C4 switches of the transport network 38 to create, for channel k, a demodulator n°1 connection with the common interface module available designated to process this signal (for example, the CI n°1 module), and then from this module to the input of the demultiplexers 18 (for example TS2), which is not used to receive the signals from the previously mentioned channel i. In this case, the signals of each of the two channels i and k are respectively decoded by the common interface modules CI n°2 and CI n°1.

This routing is carried out after the microprocessor has applied the activation procedures for the new module available (module CI n°1) in compliance with the Common Interface standard previously mentioned, allowing channel k to be watched. In this way, the demultiplexers will receive via the transport network 38 signals that have been correctly demodulated and decoded for each of these two channels i and k, permitting incorporation of the image, and/or to record one and to watch the other simultaneously in a combi type device, without the user having to worry if the channels i and k belong to the same multiplex or not.

In the second case, the signals from channels i and k are attributed to the same demodulator belonging to the same multiplex, but are attributed to mutually different interface modules for their decoding. In this case, the microprocessor 24 will command the switches C1-C4 of the transport network 38 to create, for channel k, a connection for example from the demodulator n°1 (which is the same as for channel i) passing first via the interface module used for the channel being watched i. The latter then acts as a transmission belt to transmit, via the line L5, the signals from channel k to the input of the common interface module CI n°2 to be used for this channel (which is the one used for channel i). The signals from channel k are thus decoded by the common interface module CI n°2, in compliance with the TA table, and transmitted decoded from the latter to the available input TS2 of the multiplexers. This routing is carried out after the microprocessor 24 has applied the activation procedures for the new module available (module CI n°2) in compliance with the Common Interface standard previously mentioned, allowing channel k to be watched.

It is noted that the routing network 38 permits the order of concatenation (connections L9 and L13) to be inverted by passing the signal destined for the common interface module CI n°1 first via the common interface module CI n°2.

At user level, the result of the routing is invisible. In the first case as in the second case, the user does not need to know which demodulator, multiplex or common interface module is attributed to each of the channels being watched or processed. The management of the attribution of these units is completely handled by the microprocessor 24 of the host which commands the routing by the switches C1-C4 of the transport network 38 with reference to the TA table stored in the non-volatile memory 44.

The exemplary embodiment described above only concerns two different demodulators and two different common interface modules for reasons of simplicity. However, the principle of the present invention can cover any greater number of demodulators and common interface modules, and one of ordinary skill in the art can easily adapt the transport network of the described embodiment to selectively switch the signals from a number d of demodulators to a number x of demultiplexing inputs via one or more common interface modules from a number m of such modules, where d, x and m are whole numbers equal to or greater than 2.

In fact, this information can be used in complex reception systems permitting combinations of: image incorporation, recording of one or more channels not being watched in real time, and/or the distribution of demodulated signals to different operating sources, for example within a building.

The method of the present invention can be embedded in hardware, software, or a combination of hardware and software. Any processor, controller, or other apparatus adapted for carrying out the functionality described herein is suitable. A typical combination of hardware and software could include a general purpose microprocessor (or a controller) with a computer program that, when loaded and executed, carries out the functionality described herein.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A routing device for transporting digital data from demodulated digital television signals, said routing device comprising:

a network that includes means for connecting to at least two independent demodulation channels, each of the demodulation channels producing digital data from a demodulator, the network allowing individual routing of the digital data from each of the demodulation channels to demultiplexers via at least one decoding module, wherein the routing device manages data flow to at least two decoding modules that are connected in a chain, and the network includes connection means for allowing a direction in which the digital data is routed through the chain to be selected.

2. The routing device of claim 1, wherein the routing device is capable of being connected to a plurality of decoding modules, and the connection means allows any of the demodulation channels to be connected to any of the decoding modules.

3. The routing device of claim 1, wherein the connection means allows the digital signals to be routed through successive decoding modules in a selectable order.

4. The routing device of claim 1, wherein the connection means connects to at least two data inputs of the demultiplexers, such that each of the data inputs are able to independently receive data originating from any of the demodulation channels.

5. The routing device of claim 1, wherein the routing device carries out the routing in response to commands from a host device that manages demodulation of the digital signals, decoding of the digital data and demultiplexing of the data.

6. A host device for managing reception of digital television signals, the host device being associated with at least one decoding module, said host device comprising:

at least two independent demodulation channels for suppling independently demodulated digital data issued from respective demodulation channels;

a routing device for transporting digital data from demodulated digital television signals, the routing device including a network that includes means for connecting to the at least two independent demodulation channels, each of the demodulation channels producing digital data from a demodulator, the network allowing individual routing of the digital data from each of the demodulation channels to demultiplexers via at least one decoding module; and a processor allowing each of the demodulation channels to be attributed with a respective one of the decoding modules and commanding the routing device to route the digital data of each of the demodulation channels from the demodulation channel attributed to the decoding module or to each of the decoding modules attributed and to an input of the demultiplexers, wherein the routing device manages data flow to at least two decoding modules that are connected in a chain, and the network includes connection means for allowing a direction in which the digital data is routed through the chain to be selected.

7. The host device of claim 6, further comprising an attribution table stored in a memory, the table permitting the identification, for each channel, of the demodulation channel (s) to be attributed and the decoding module(s) to be attributed.

8. The host device of claim 6, wherein the processor simultaneously manages signals from at least two active channels, each channel being processed by a respective demodulation channel, and the demodulated data of each channel being sent simultaneously to the respective inputs of the demultiplexing means.

9. The host device of claim 8, wherein the at least two active channels are issued from mutually different digital television signal transmission multiplexes.

10. The host device of claim 6, wherein at least one decoding module is a common interface module in compliance with an established digital television standard.

11. The host device of claim 6, further comprising means for managing at least two independent demodulation channels, issued from respective multiplexes in simultaneous mode.

12. A digital television signal receiver comprising a television combined with a recording device, so as to all simultaneous on screen reproduction of one channel and recording of another channel, the digital television signal receiver including a host device according to claim 6.

13. A digital television signal receiver with an image incorporation function that allows two images from different channels to be simultaneously displayed, the digital television signal receiver including a host device according to claim 6.

14. A routing method for transporting digital data from demodulated digital television signals, using a network for routing the data to demultiplexers via at least one decoding module, said method comprising the steps of:
connecting a connection means of the network to at least two independent demodulation channels, each of the demodulation channels producing digital data from a demodulator;
individually routing the digital data from each of the demodulation channels to the demultiplexers via at least one decoding module;
managing at least two decoding modules that are connected in a chain; and
selecting a direction in which the digital data is routed through the chain.

15. The routing method of claim 14, further comprising the step of:
providing the at least two decoding modules,
wherein the in the routing step, any of the demodulation channels can be routed to any of the decoding modules.

16. The routing method of claim 14, wherein the in the routing step, the digital data can be routed through successive decoding modules in a selectable order.

17. The routing method of claim 14, further comprising the step of providing a connection to at least two demodulated data inputs from the demultiplexers, such that each of the data inputs are able to independently receive data from any one of the demodulation channels.

18. The routing method of claim 14, further comprising the step of providing a host device that controls the routing, manages the demodulation of the digital signals, the decoding of the digital data and the demultiplexing of the data.

19. The routing method of claim 14, further comprising the step of managing at least two independent demodulation channels from respective multiplexes, in simultaneous mode.

20. A method for simultaneous management of at least a first and a second channel of modulated digital television signals, said method comprising:
performing the routing method of claim 14,
wherein the data of the first channel is intended for on screen display of a main image, and
the data of the second channel is intended for incorporation of a second image in the main image.

21. A method for simultaneous management of at least a first and a second channel of modulated digital television signals, said method comprising:
performing the routing method of claim 14,
wherein the data of the first channel is intended for on screen display in real time, and
the data of the second channel is intended for recording by a recording device.

22. A method for simultaneous management of at least a first and a second channel of modulated digital television signals, said method comprising:
performing the routing method of claim 14,
wherein the first and second digital data channels belong to mutually different digital television transmission signal multiplexes.

* * * * *